(12) United States Patent
Rapp et al.

(10) Patent No.: US 12,008,580 B2
(45) Date of Patent: Jun. 11, 2024

(54) NATURAL LANGUAGE PROCESSING MACHINE LEARNING TO CONVERT SERVICE RECOMMENDATIONS TO ACTIONABLE OBJECTS

(71) Applicant: SAP SE, Walldorf (DE)

(72) Inventors: Roman Rapp, Ettlingen (DE); Sunil Kumar Panda, Bangalore (IN); Vinay Sheel, Bangalore (IN); Jatin Kochhar, Bangalore (IN)

(73) Assignee: SAP SE, Walldorf (DE)

( * ) Notice: Subject to any disclaimer, the term of this patent is extended or adjusted under 35 U.S.C. 154(b) by 379 days.

(21) Appl. No.: 17/537,003

(22) Filed: Nov. 29, 2021

(65) Prior Publication Data

US 2023/0169516 A1 Jun. 1, 2023

(51) Int. Cl.
*G06F 40/253* (2020.01)
*G06F 40/205* (2020.01)
*G06F 40/211* (2020.01)
*G06F 40/284* (2020.01)
*G06F 40/30* (2020.01)
*G06F 40/56* (2020.01)
*G06Q 30/016* (2023.01)

(52) U.S. Cl.
CPC ......... *G06Q 30/016* (2013.01); *G06F 40/205* (2020.01); *G06F 40/253* (2020.01); *G06F 40/56* (2020.01)

(58) Field of Classification Search
CPC ...... G06F 40/205; G06F 40/253; G06F 40/56; G06F 40/211; G06F 40/284; G06F 40/30; G06F 40/35; G06F 16/3329; G06F 16/90332; G06F 16/9024; G06F 16/35; G06F 16/00; G06F 16/3344; G06F 16/9535; G06F 17/2785; G06F 8/30; G06Q 30/016; G06N 20/00; G06N 5/04
USPC ......................................................... 704/1–9
See application file for complete search history.

(56) References Cited

U.S. PATENT DOCUMENTS

| | | | |
|---|---|---|---|
| 8,977,948 B1 | 3/2015 | Balfe et al. | |
| 9,229,800 B2 | 1/2016 | Jain et al. | |
| 9,990,422 B2 | 6/2018 | Chang | |
| 10,354,009 B2 | 7/2019 | Liang et al. | |
| 10,402,435 B2 | 9/2019 | Jain et al. | |
| 10,534,788 B2 | 1/2020 | Agarwal et al. | |
| 10,956,181 B2 | 3/2021 | Banne | |
| 11,275,893 B1* | 3/2022 | Zaman | G06N 3/08 |
| 2014/0006429 A1* | 1/2014 | Rakshit | G06F 16/242 |
| | | | 707/755 |

(Continued)

*Primary Examiner* — Leshui Zhang
(74) *Attorney, Agent, or Firm* — SCHWEGMAN LUNDBERG & WOESSNER, P.A.

(57) ABSTRACT

In an example embodiment, a natural language processing (NLP) machine learning and rules-based text extraction and analysis approach is used to convert a textual service recommendation document into customer-tailored actions considering the specific context-based executable script. This creates end-to-end automation in implementing suggestions provided in textual documents. Actions mentioned in the document can be processed automatically whenever possible, or at least transformed into a semi-automated action with system support. The solution can be configured to automate end-to-end converting of documents into personalized technical scripts and implementing these scripts at the customer-side.

17 Claims, 9 Drawing Sheets

(56) References Cited

U.S. PATENT DOCUMENTS

| | | | | |
|---|---|---|---|---|
| 2015/0066814 | A1* | 3/2015 | Allen | G06F 40/30 |
| | | | | 706/11 |
| 2015/0106078 | A1* | 4/2015 | Chang | G06F 16/35 |
| | | | | 704/9 |
| 2016/0306689 | A1* | 10/2016 | Jain | G06N 20/00 |
| 2017/0140010 | A1* | 5/2017 | Agarwal | G06Q 10/0633 |
| 2018/0060302 | A1* | 3/2018 | Liang | G06F 16/35 |
| 2018/0157641 | A1* | 6/2018 | Byron | G06F 16/23 |
| 2020/0226325 | A1* | 7/2020 | Mishra | G06F 40/295 |
| 2021/0157985 | A1* | 5/2021 | Rotkop | G06F 40/205 |
| 2022/0101115 | A1* | 3/2022 | Zhou | G06F 40/103 |

\* cited by examiner

NATURAL LANGUAGE PROCESSING MACHINE LEARNING TO CONVERT SERVICE RECOMMENDATIONS TO ACTIONABLE OBJECTS

TECHNICAL FIELD

This document generally relates to machine learning. More specifically, this document relates to the use of natural language processing machine learning to convert service recommendations to actionable objects in a computer system.

BACKGROUND

Software-as-a-service involves licensing centrally hosted software on a subscription basis. Often the software is hosted in a cloud environment, and the software is able to offer various types of service to customers as part of a service contract. These services are usually carried out by the customer, or alternatively by partners or consultants on the customer tenant. As a result of service execution, a service report is generated and shared with the customer. The service report generally includes the results of various checks along with ratings, recommendations, and/or solutions for any issues occurring during execution of the service.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Despite recent progress in automation of service report processing, organizations still find it difficult to turn service reports into actionable objects in a computer system. Performing such actions manually involves users reading the service reports and then deciding how to implement the recommended solutions for their particular combination of software and service. Often the service reports have references to more than one note and knowledge-based action (KBA). The recommendations in the notes and KBAs can be very generic and do not consider the customer-specific context (e.g., the data size of certain tables, perhaps exceeding a set threshold designated by a service check). Robotic Process Automation (RBA) is a machine-learning process where multiple artificial intelligence software robots monitor task performance and automate the task based on prior performance. Such technology, however, is not capable of converting a service report into an actionable script. This is because carrying out actions on customer cloud tenants and on-premise systems requires technical know-how, both in terms of infrastructure and well deployed solutions.

In an example embodiment, a natural language processing (NLP) machine learning and rules-based text extraction and analysis approach is used to convert a textual service recommendation document into customer-tailored actions considering the specific context-based executable script. This creates end-to-end automation in implementing suggestions provided in textual documents. Actions mentioned in the document can be processed automatically whenever possible, or at least transformed into a semi-automated action with system support. The solution can be configured to automate end-to-end converting of documents into personalized technical scripts and implementing these scripts at the customer-side.

More particularly, the solution analyzes the unstructured free-flow textual document and extracts actionable insights from it. It identifies linkages of reference documents mentioned in the original document and extracts the details even from the linked documents. It then identifies the impacted tool and condition under which action needs to be performed on the tool. It then converts the generic actions into personalized actions, considering the customer-specific context. The solution then executes the actions at the customer deployment (or at least supports semi-automated action triggering).

Figure 1:
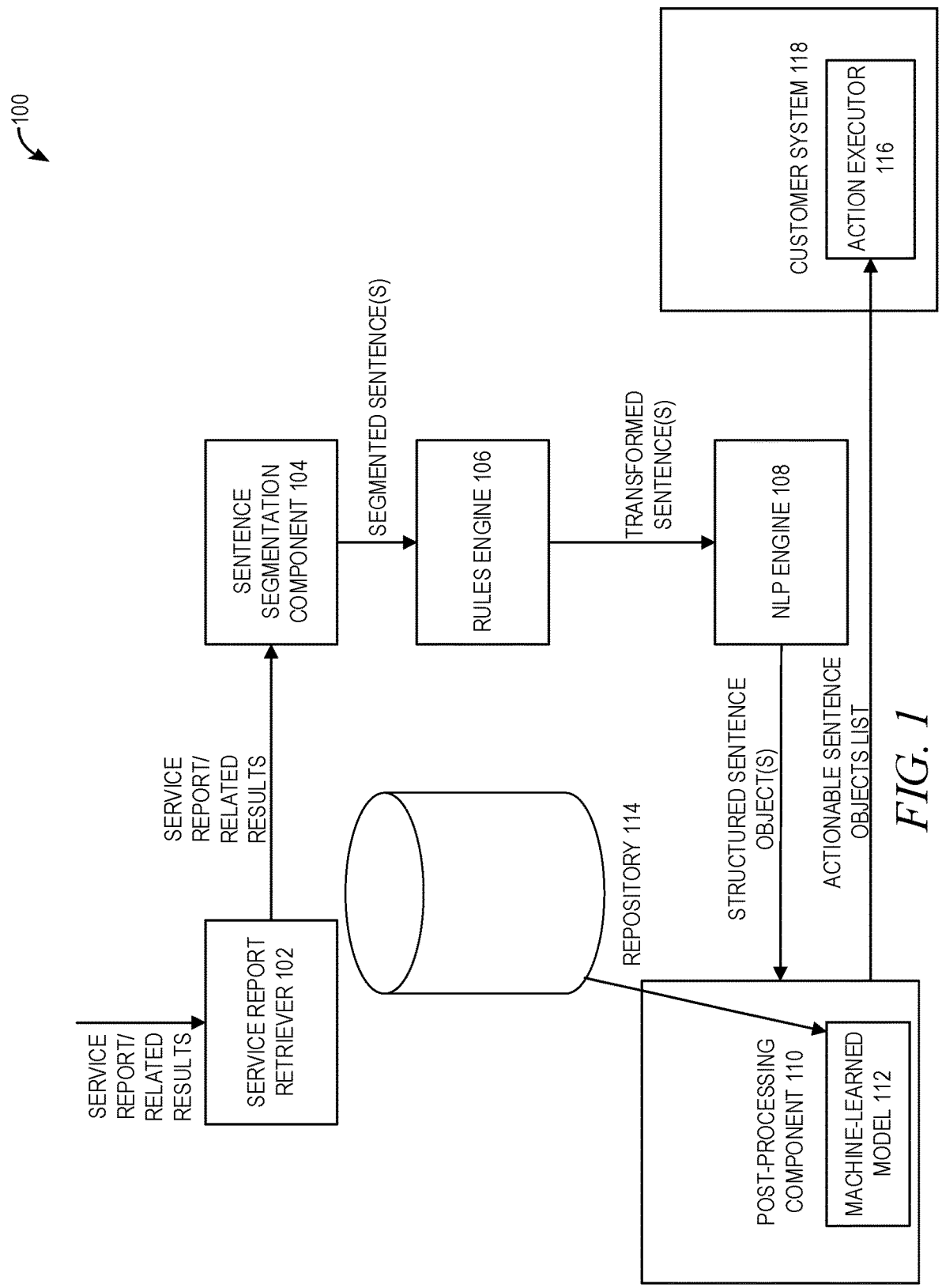
FIG. 1 is a block diagram illustrating a system for converting a service report into one or more actionable objects in a computer system, in accordance with an example embodiment.

FIG. 1 is a block diagram illustrating a system 100 for converting a service report into one or more actionable objects in a computer system, in accordance with an example embodiment. In an example embodiment, the system 100 may be implemented at an intelligent enterprise data platform, such as a data lake.

A service report retriever 102 obtains a service report and all related results. This may be performed by feeding the service report retriever 102 a note number or service session number, which the service report retriever 102 then uses to access a repository of service reports to retrieve the corresponding service report. The service report is in unstructured text; it may include technical jargon, and may additionally refer to other documents and even other service reports. The service report may have been generated by a customer system executing one or more service checks on a service.

For example, the service check may determine if any database tables in a database are larger than a preset threshold, and if so, may recommend various actions, such as archiving, take place to reduce the size of those oversized tables. These recommendations may be contained in the service report.

The corresponding service report is then passed to a sentence segmentation component 104. The sentence segmentation component 104 extracts a solution section from notes or service recommendations text from service results related to the corresponding service report. Any such extracted notes solution texts or service recommendation texts then have a sentences extraction rule applied to them, to extract individual sentences. The sentence extraction may be performed using an NLP algorithm with custom rules to break the solution/recommendation textual data into individual sentences.

The individual sentences are passed to a rules engine 106, which performs pre-processing/transformation on each sentence. This is used to help address technical jargon in the individual sentences that could adversely affect NLP processing. For example, a sentence may include the text "set property smd.use.default.Trustmanager to true." In that sentence, the periods in between the parts of the object name are not representative of the end of the sentence, but traditional NLP techniques would consider each period a full stop and terminate the sentence on each. The rules engine 106 applies preprocessing and transformation rules in such a way that technical jargon mentioned in the sentences do not confuse the NLP processing and also helps to ensure that the NLP processing extracts the correct information without losing any contextual data. In other words, the preprocessing changes the technical jargon into content that can be processed by the NLP algorithm.

More particularly, in an example embodiment, a mapping is maintained between technical jargon and alternative terms that do not adversely affect NLP processing. An example of such a mapping is as follows:

| From | To |
|---|---|
| OK | Ok button |
| press | click |
| Press | Click |
| Restart | Start Again |
| Restart | Start again |
| > | splfwdarrowspl |
| < | splbckarrowspl |
| / | splfwdslashspl |
| \ | splbckslashspl |
| = | splequalspl |

In a further example embodiment, this mapping may be customized for different industries or groups of users. Thus, there may be multiple mappings and the mapping corresponding to the industry or group of user to which the overall process is being applied can be retrieved and used when needed. The rules engine 106 also categorizes sentences as either "information only" or "action involved".

Each transformed sentence is then passed to an NLP engine 108. The NLP engine 108 applies one or more NLP rules to the input sentence, filters sentence words into grammatical entities, and produces structured sentence objects. More particularly the NLP engine 108 determines a grammatical type (e.g., noun, verb, etc.) for each word, and the dependencies between each word. Each dependency is indicative of the grammatical relationship between words, such as whether one of words is a direct object of the other word, punctuation for another word, adverbial clause modifier (advcl) for the other word, etc.

NLP processing may include general filtering actions such as removing unwanted words and characters from the text. This may include removing unnecessary spaces, removing standard punctuations such as !"#$%&'( )+,-./:;<=>?@[\]^_'{|}~, keeping only characters containing the letters a-z and the numbers 0-9, normalizing case (such as by converting everything to lowercase), removing stop words such as 'i', 'me', 'my', 'myself', 'we', 'our', 'ours', 'ourselves', 'you', 'your', 'yours', 'yourself', 'yourselves', 'he', 'him', 'his', etc., removing greeting words such as "hi, hello, regards, kind, regards, etc.", and the replacing of some words with regular expressions. Additionally, stemming and lemmatization of words may be performed. Stemming and Lemmatization are text normalization techniques. Stemming is the process of reducing inflection in words to their root forms, such as mapping a group of words to the same stem even if the stem itself is not a valid word in the language. Thus, stemming a word involves removing prefixes and suffixes. Lemmatization, on the other hand, reduces the inflected words to a root form that is part of the language. This root word is called a lemma. Lemmatization involves identifying a canonical version of a word, and the canonical version may involve more or less than merely removing suffixes and prefixes. For example, ran, run, and running may be lemmatized to the canonical word "run", even though changing ran to run does not involve adding or removing suffixes.

Figure 2:
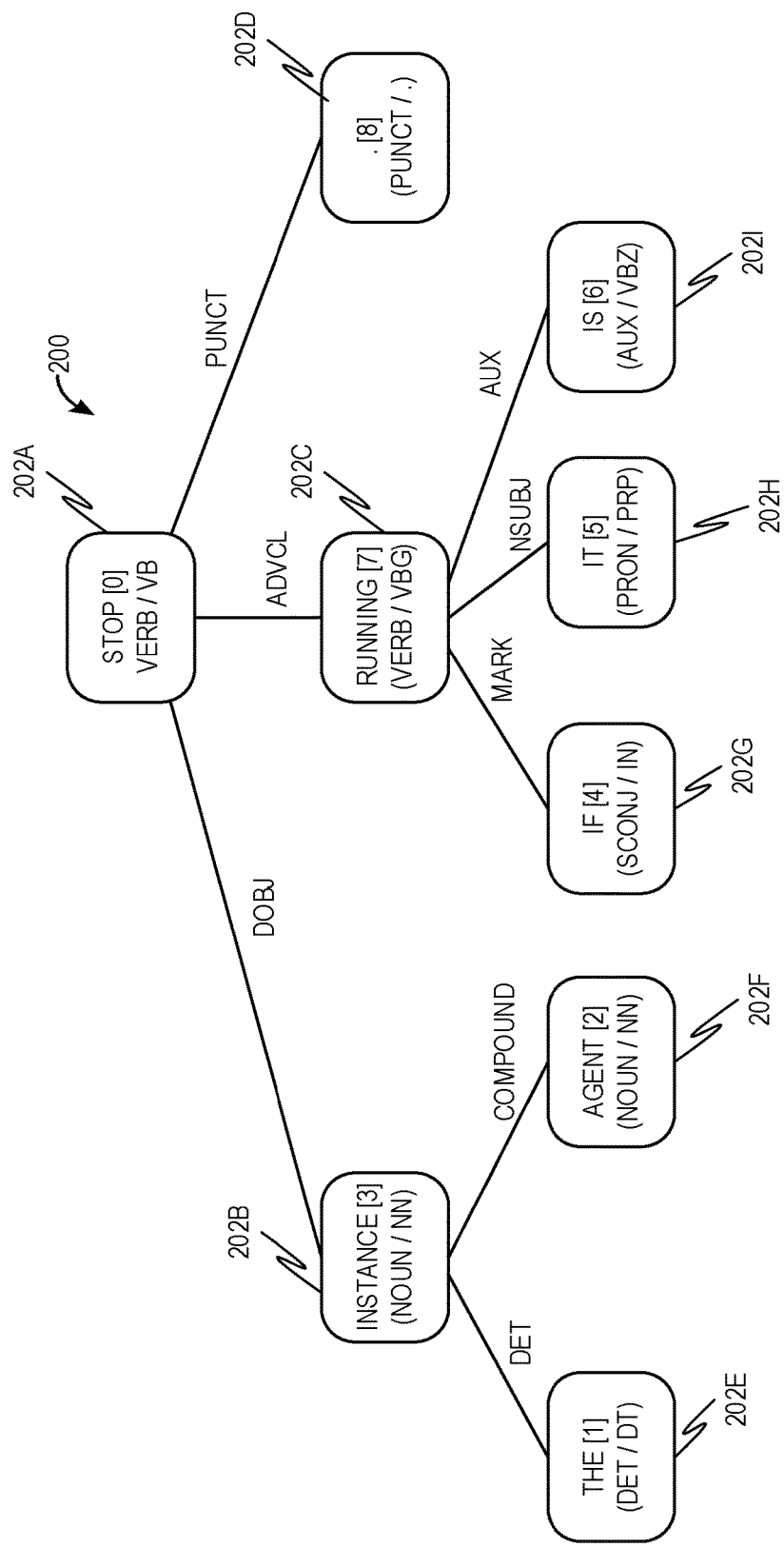
FIG. 2 is a diagram illustrating an example graph formed by the output grammatical dependency objects of a sentence, in accordance with an example embodiment.

FIG. 2 is a diagram illustrating an example graph 200 formed by the output grammatical dependency objects of a sentence, in accordance with an example embodiment. Here, the sentence "Stop the agent instance if it is running." is parsed into nine nodes 202A-202I. Node 202A corresponds to the word "stop" and node 202B corresponds to the word "instance." Here, the NLP engine 108 has determined that node 202B is dependent on node 202A, in that the word "instance" is a direct object of the word "stop" in the sentence. Node 202E corresponds to the word "the" and is a determiner of the word "instance," while node 202F corresponds to the word "agent" and is a compound word with "instance." The nodes contained in shape 204 represent the action to be taken.

Figure 3:
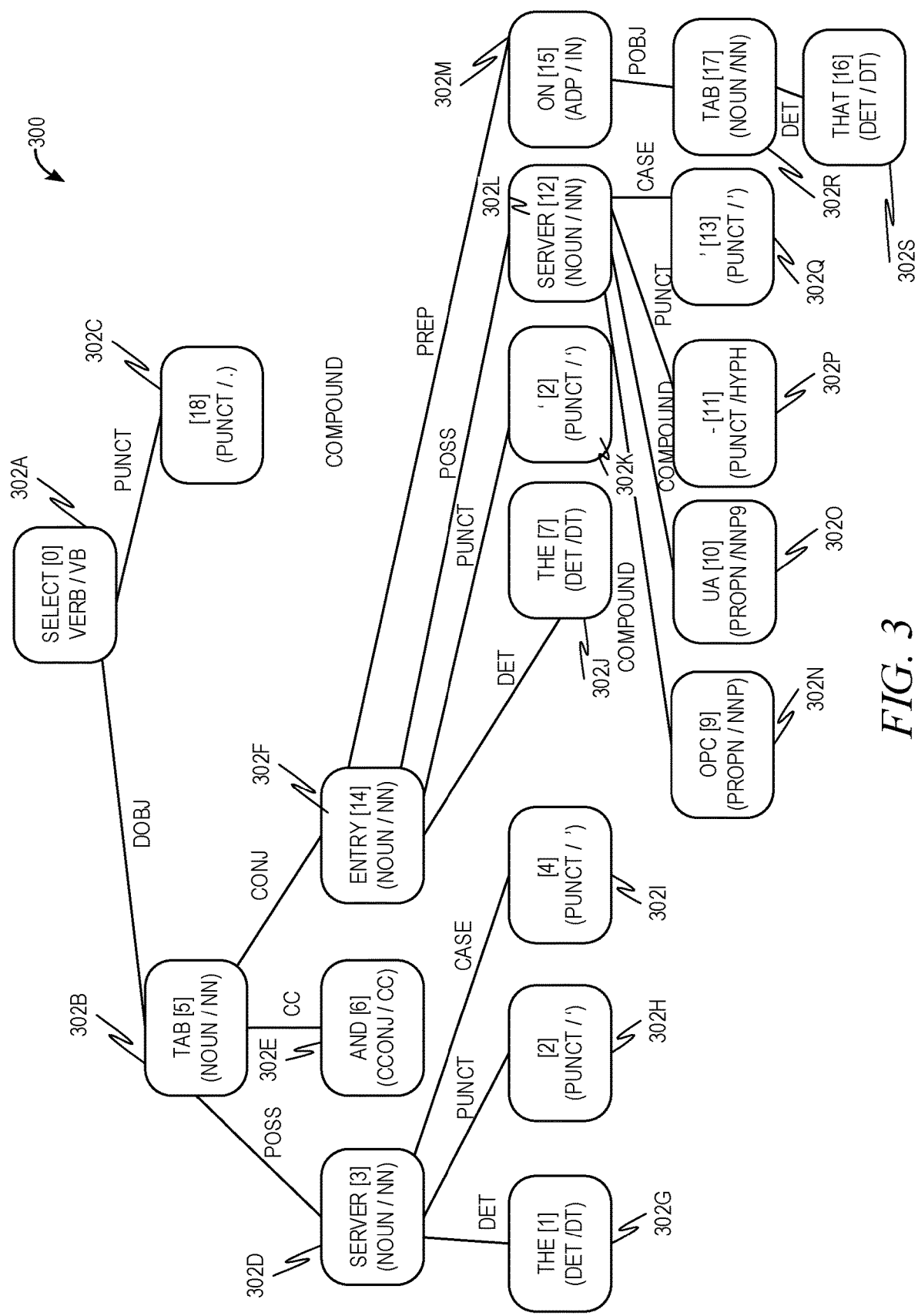
FIG. 3 is a diagram illustrating another example graph formed by the output grammatical dependency objects of another sentence, in accordance with an example embodiment.

FIG. 3 is a diagram illustrating another example graph 300 formed by the output grammatical dependency objects of another sentence, in accordance with an example embodiment. Here, the sentence "Select the 'Server' tab and the 'OPC UA-Server' entry on that tab." is parsed into nineteen nodes 302A-302S.

The NLP algorithm finds out all the grammatical dependency objects in the sentence, the relationships among objects, the conditions involved in the sentence, and then, based on all this information, prepares the context of the sentence. Based on the context, a final result corresponding to the sentence is suggested as follows:

Whether sentence has any action suggested for the execution.

For any action, the object on which action need to be performed, condition involved OR condition that need to be taken care while executing the sentence, and any document referenced, such as a reference to another service report.

For any reference to other documents, those referenced documents are collected and the same logic is applied to them to extract the actionable context from referenced document too.

For sentences with more than one action (e.g., "Change the configuration parameter value from A to B and then start the server"). the "and" conjunction is identified, and the sentence is broken into two actionable sentence objects, with the above rules on all the actionable sentence objects (e.g., two actionable objects: "Change the configuration parameter value from A to B" and "Start the server")

Referring back to FIG. 1, it should be noted that the transformed sentences can also be passed back to the service report retriever 102, so that they may be reused for any other notes/recommendations having the same sentences.

In an example embodiment, a Token-to-Vector (Tok2Vec) algorithm is used in the NLP engine 108 to perform the NLP aspects. The Tok2Vec algorithm may include two subnetworks. The first is a subnetwork for embedding, which embeds tokens into context-independent word vector representations. The word vector representations are called embeddings and are coordinates in an n-dimensional space that represent the corresponding token that has been embedded. The assignment of coordinates is based on an embedding model, which is its own machine learned model trained to assign similar coordinates to similar tokens (and dissimilar coordinates to dissimilar tokens), such that the geometric (e.g., cosine) distance between two coordinate sets represents how similar or different the corresponding tokens are. The second subnetwork is for encoding, and may utilize a convolutional neural network, Bidirectional Long Short-Term Memory (BiLSTM), or the like.

Figure 4:
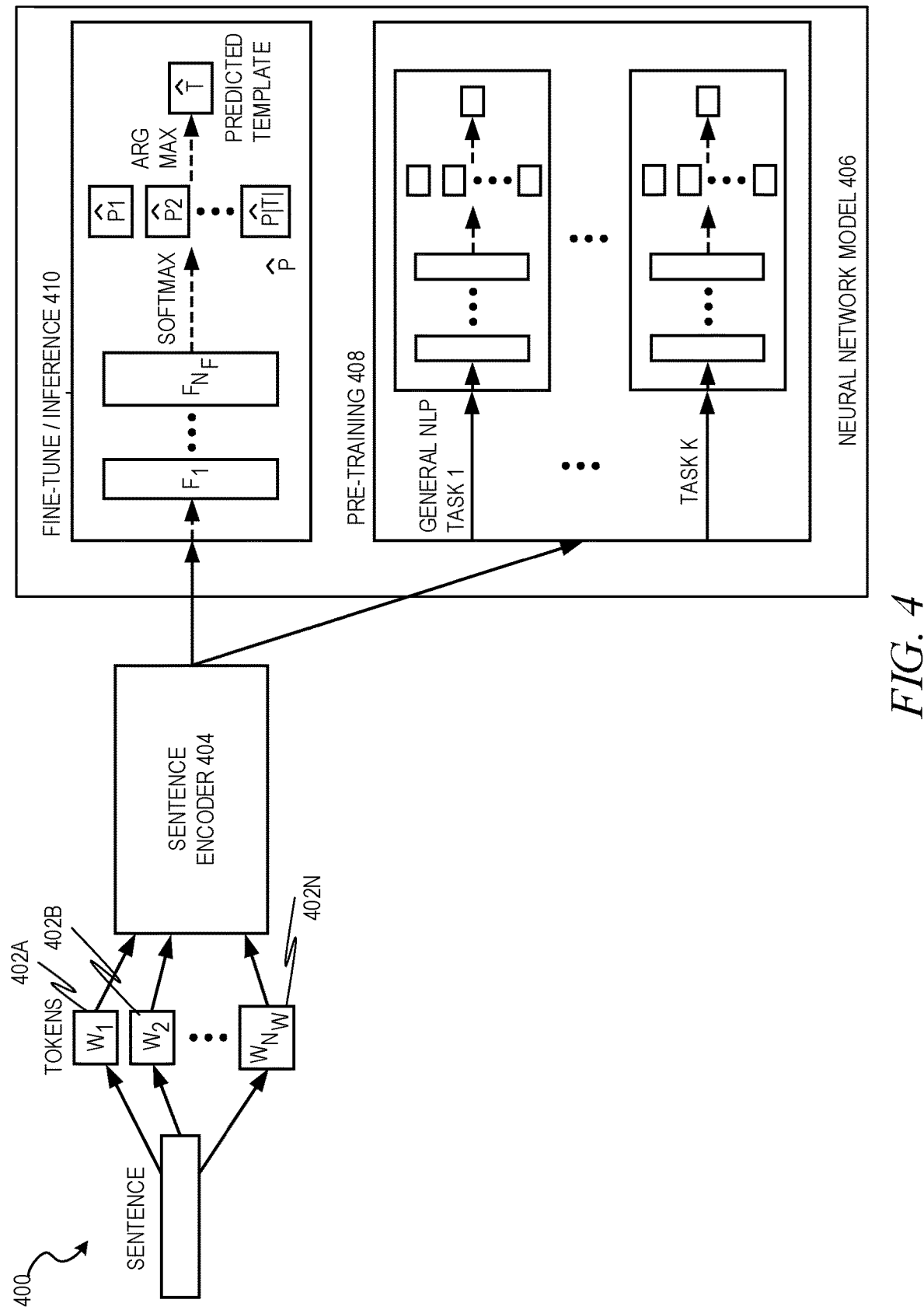
FIG. 4 is a block diagram illustrating a deep neural network in accordance with an example embodiment.

In one example embodiment, the NLP engine 108 implements a deep neural network having a sentence encoder, with the neural network programmed with a loss function. FIG. 4 is a block diagram illustrating a deep neural network 400 in accordance with an example embodiment. Each sentence is split into a series of tokens 402A-402N, and each of the series of tokens 402A-402N is passed to a sentence encoder 404, which utilizes a neural network model 406. In an example embodiment, the sentence encoder 404 is first pre-trained 408 with general tasks, and then the sentence encoder 404 is fine-tuned 410 with a multilayer perceptron network (MLP) using the template classification data.

The MLP learns how to parse a sentence and assign an embedding to the sentence based on the parsing. The embedding identifies a set of coordinates (called a vector) in a multidimensional space to each parsed sentence. One or more similarity measures between coordinates may then be used to identify the similarity between corresponding sentences. One example metric is cosine similarity. In cosine similarity, the cosine of the angle between two vectors is computed. The cosine similarity of two sentences will range from 0 to 1. If the cosine similarity is 1, it means the two vectors have the same orientation and thus are identical. Values closer to 0 indicate less similarity. Other measures of similarity may be used, in lieu of or in addition to the cosine similarity, such as Euclidean distance and Jaccard similarity. Additionally, these baseline metrics can be improved by methods such as ignoring "stop" words and computing averages weighted by term frequency—inverse document frequency (TF-IDF). Alternatively, techniques such as Word Mover's Distance (WMD) and Smooth Inverse Frequency (SIF) can also be employed.

In an example embodiment, the deep neural network is a Long Short Term Memory (LSTM) network. An LSTM network is a special type of Recurrent Neural Network (RNN). RNNs have loops in them, allowing information to persist. Specifically, information from an RNN is sent back to itself, so that over time the RNN is actually learning from itself. One of the appeals of RNNs is that they may be able to connect previous information to a present task. However, they can have trouble in making predictions based on non-recent information. For example, an RNN trained to predict the meaning of a last word in a long sentence may be able to accurately make that prediction based on the prior few words in the long sentence, but it may not perform well if the key to understanding the last word in the long sentence was the first word in the long sentence. As the gaps between words grows, RNNs become less able to connect the information.

In an example embodiment, an LSTM network is used to avoid this long-term dependency problem. An LTSM has four separate neural network layers interacting in a special way. The first layer is a sigmoid layer that decides which information to discard from the cell state. This layer decides what information to forget, such as forgetting the gender of a subject when a new subject is encountered in a sentence. The second layer is a sigmoid layer that decides which values to save in the cell. The third layer then actually updates the new cell state based on the decisions from the first and second layers. The fourth layer is another sigmoid layer that decides what will be output.

Figure 5:
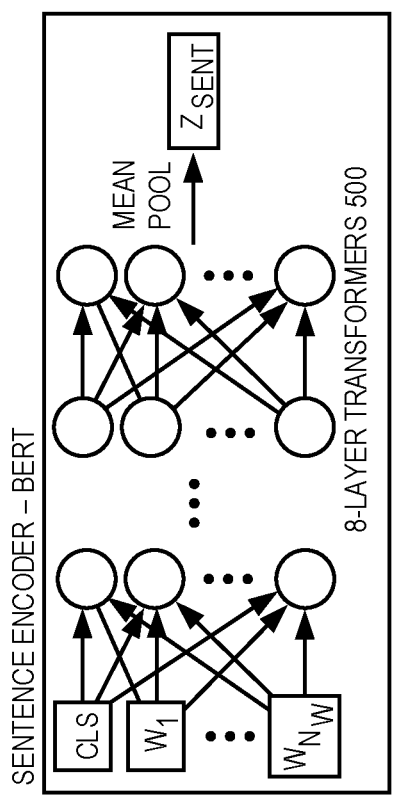
FIG. 5 is a block diagram illustrating Bidirectional Encoder Representations from Transformers (BERT) in accordance with an example embodiment.

In an example embodiment, Bidirectional Encoder Representations from Transformers (BERT) are used to encode sentences into embeddings in the sentence encoder 404. It should be noted that BERT is merely used in some example embodiments, and in others another language model can be used in lieu of BERT. FIG. 5 is a block diagram illustrating BERT in accordance with an example embodiment. BERT uses transformer layer(s) 500 to encode the input sentence to embedding. Each transformer layer is defined as follows:

$$TFLayer(h^{n-1}) = FC(MultiAttn(h^{n-1}));$$

$$FC(x) = relu(xW_1 + b_1)W_2 + b_2;$$

$$MultiAttn(h^{n-1}) = \text{concat}\left(head_1(h^{n-1}), \ldots, head_k(h^{n-1})\right)W^O,$$

$$head_i(h^{n-1}) = \text{softmax}\left(\frac{(h^{n-1}W_q^i)(h^{n-1}W_k^i)}{\sqrt{d_k}}\right)(h^{n-1}W_v^i).$$

where $h^{n-1}$ is the output of the previous transformer layer. Here, a BERT model with 8 transformer layers is used, and the output sentence embedding $z_{sent}$ is defined as the mean-pooling result of the last transformer layer's output. For simplicity, batch normalization and residual connections are omitted in the equations.

The structured sentence objects from the NLP engine 108 are then passed to a post processing component 110.

The post processing component 110 has a machine-learned model 112 that is applied to each structured sentence object to map a best fit between the structured sentence object and software tools/actions. The dependence objects are mapped with corresponding product entities. A repository 114 contains data about applications, actions, attributes required to perform actions, application tools, etc. The following is an example of a mapping table:

| Tool | Command (English Text) | Technical command Name | Actual Command | Dependent Parameter |
|---|---|---|---|---|
| PCO Management Console | Open, Launch, Start, Restart, Execute | Execute | WinExec (PCM.exe) | PCM installation path |
| Agent Instance | Stop, Shutdown, kill | Stop | Taskkill "agentinstance.exe" | Agent instance path |
| Agent Instance | Running status | isRunning | FindPID "agentinstance.exe" | Agent instance path |
| Agent Instance | Save, Updated | Save | Update "agentinstance" | Agent instance path and attributes to be updated |
| ... | ... | ... | ... | ... |

Each row corresponds to a different actual command, which may map to multiple different English language commands. For example, both "Open" and "Launch" In English map to the actual command WinExec (PCM.exe). The repository 114 may maintain this table. The tools in the tool column are obtained by referencing the repository. The machine-learned model 112 is trained to find matching tools, matching actions, and dependencies.

In an example embodiment, content creation systems allow service consultants to create content, such as recommendations. Templates may be utilized as part of this content creation process, with the templates containing certain placeholders for each of the recommendations being defined, and the templates also specifying one or more tools used to perform the recommendations. These templates may be used as training data in a machine learning algorithm to train the machine-learned model 112 to find matching tools, matching actions, and dependencies.

The output of the post processing component 110 is an actionable sentence object list, which includes a list of action(s) to be performed (sequence-wise), including any linked documents' action sequences, weight (criticality) of each action, impacted tool for each action, and conditions on which the action should be performed. The following is an example of such an actionable sentence object list:

```
{
  "Actual Recommendation": "Stop the server. You may check the server
configuration. See the note 12345",
  "Actual Issue Reported": "N/A/",
  "Processed Issue": "N/A",
  "Action suggested without weightage filter" : [
    {
      "sentence": "stop the server",
      "sentence_type": "Action",
      "weightage": 5
    },
    {
      "sentence": "you may check the server configuration.",
      "sentence_type": "Action",
      "weightage": 5
    },
    {
      "sentence": "see the note 12345",
      "sentence_type": "Action",
      "weightage": 4
    },
```

The actionable sentence object list may then be passed to an action executor 116 on a customer system 118. The action executor 116 converts the actionable sentence object list into executable functions, and then executes those functions, in order to automatically address the issues raised in the service report. Alternatively, this process may be only semi-automated, with a user being presented with the opportunity to reject or allow some or all of the functions to be executed.

Figure 6:
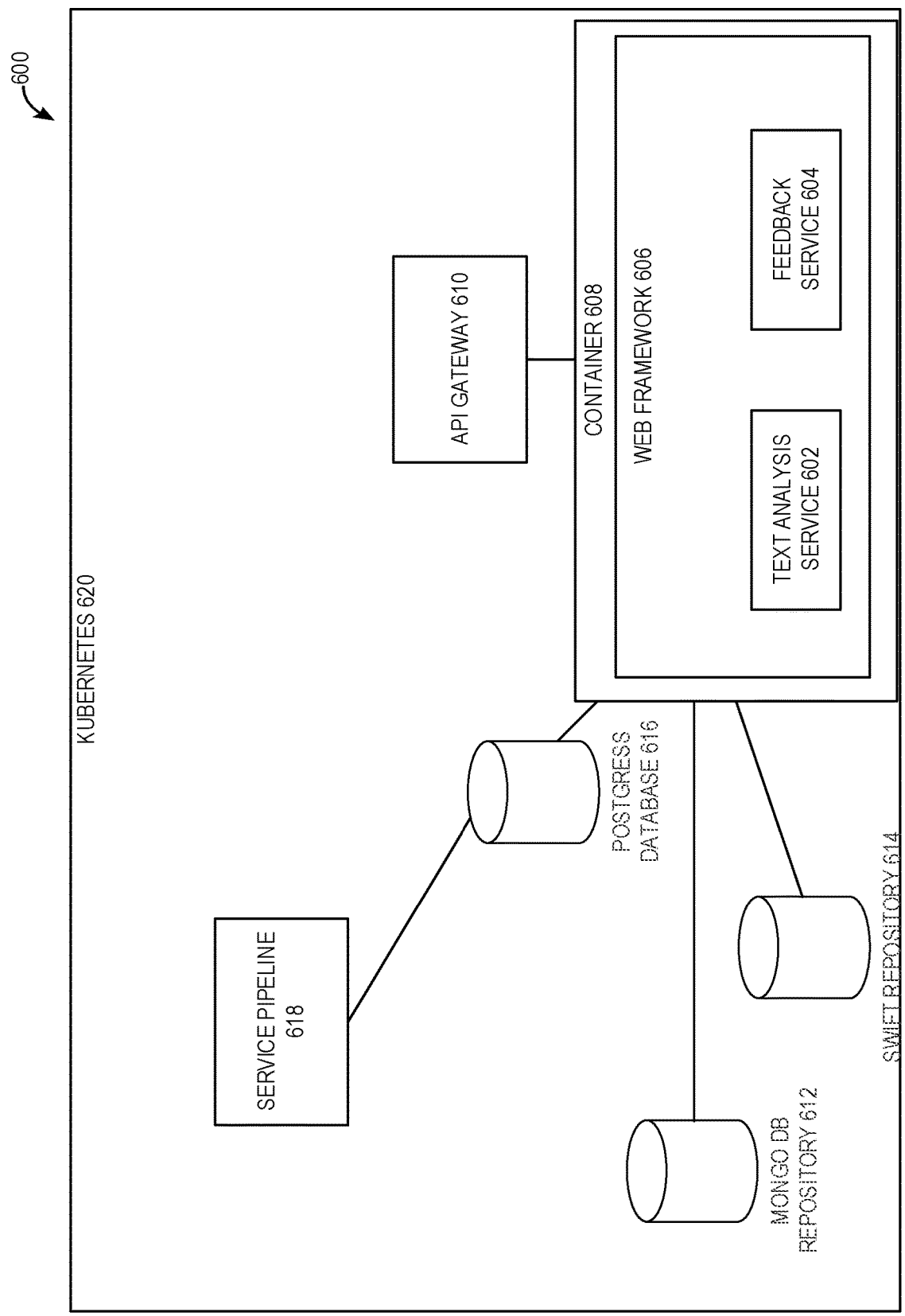
FIG. 6 is a diagram illustrating a system for converting a service report into one or more actionable objects in a computer system, in accordance with another example embodiment.

In an example embodiment, the system 100 may be exposed as an Application Program Interface (API) gateway. FIG. 6 is a diagram illustrating a system 600 for converting a service report into one or more actionable objects in a computer system, in accordance with another example embodiment. Here, a text analysis service 602 may represent an exposed gateway service, including the components of the system 100 from FIG. 1. The text analysis service 602 and a feedback service 604 may be located in a web framework 606 contained in a container 608. The container 608 may be, for example, a Kubernetes container. The text analysis service 602 is exposed via API gateway 610. This API can be consumed by applications.

The text analysis service 602 stores metadata in a Mongo database repository 612 and stores its machine-learned model(s) in a Swift repository 614. Feedback information may be collected by the feedback service 604 and stored in a postgress database 616. This feedback may represent a review of the text analysis results by service experts. The purpose of the feedback is to allow users to review the result data provided by the text analysis results and then submit the review data. The analysis result provides details such as whether the input textual sentence is an action or information, as well as weights for the action. Service experts can review the result, apply their review feedback by changing sentence category or changing the action weight value, and then submit the feedback.

A training pipeline 618 is then used to train the text analysis machine learned model. It uses feedback data stored in the Postgres repository 616 to train the model. The trained model is stored in the Swift repository 604. The text analysis service 402 then uses the model for the analysis.

Notably the entire system 600 may be implemented in Kubernetes 420.

Figure 7:
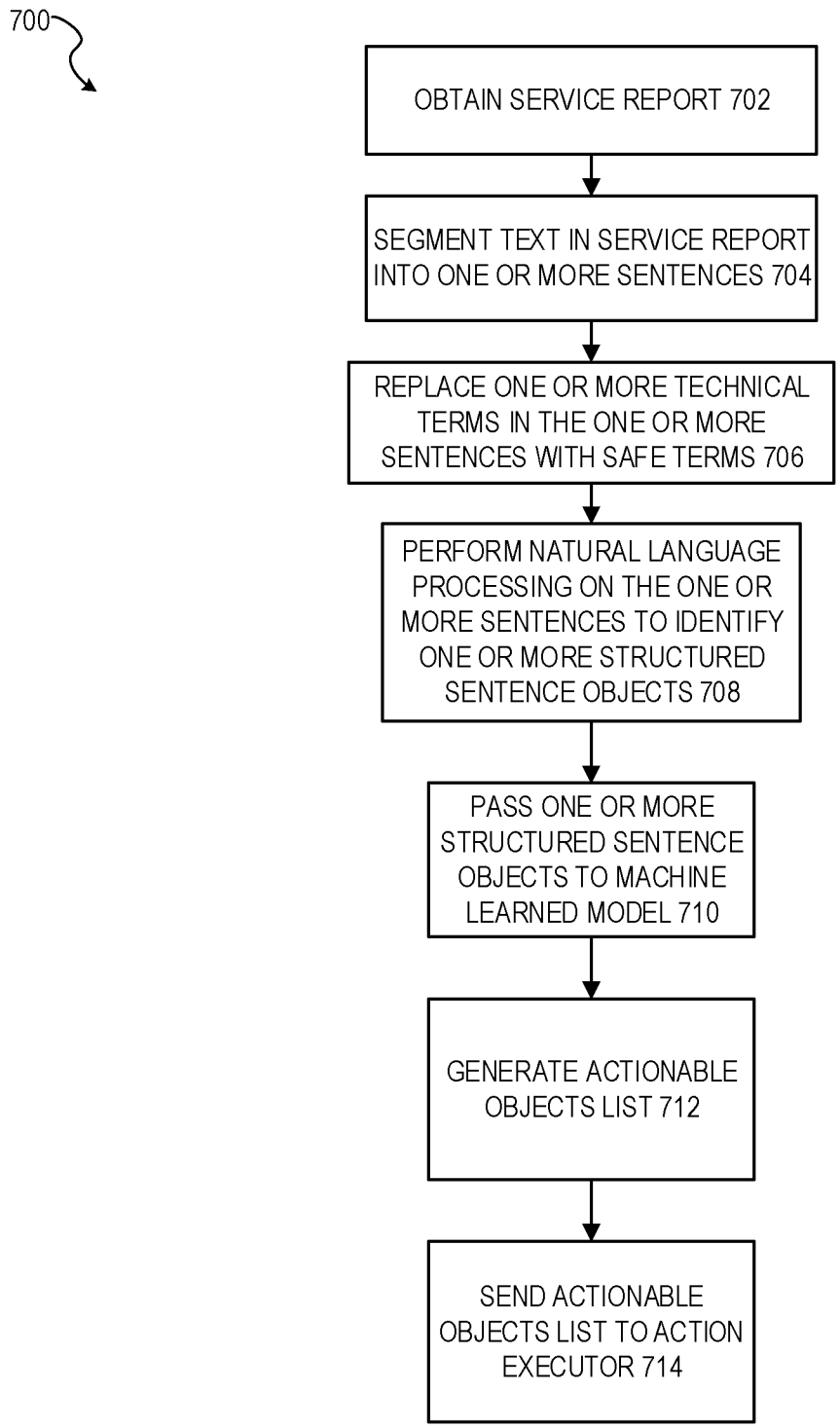
FIG. 7 is a flow diagram illustrating a method of automatically resolving a technical issue is an online software service, in accordance with an example embodiment.

FIG. 7 is a flow diagram illustrating a method 700 of automatically resolving a technical issue is an online software service, in accordance with an example embodiment. At operation 702, a service report is obtained. The service report has text indicating one or more technical issues detected during the running of an online software service and, for each of the one or more technical issues, one or more recommendations on how to address the corresponding technical issue. At operation 704, the text in the service report is segmented into one or more sentences. At operation 706, one or more technical terms in the one or more sentences are replaced with terms identified as safe for natural language processing, based on a mapping between technical terms and safe terms.

At operation 708, natural language processing is performed on the one or more sentences to identify one or more structured sentence objects of each of the one or more sentences, each structured sentence object indicating a grammatical type of a corresponding word or article of punctuation in a corresponding sentence. At 710, the one or more structured sentence objects are passed into a machine-learned model trained by a machine learning algorithm to map commands in the one or more sentences to commands available in one or more software tools. At operation 712, an actionable objects list is generated, including the mapped commands available in the one or more software tools. At operation 714, the actionable objects list is sent to an action executor on a computer system on which the online software service was running, the action executor designed to automatically execute the mapped commands in the actionable objects list to address the one or more technical issues.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a non-transitory computer-readable medium storing instructions that, when executed by the at least one hardware processor, cause the at least one hardware processor to perform operations comprising:
accessing a service report, the service report having text indicating one or more technical issues detected during running of an online software service and, for each of the one or more technical issues, one or more recommendations on how to address the corresponding technical issue;
segmenting the text in the service report into one or more sentences;
performing natural language processing on the one or more sentences to identify one or more structured sentence objects of each of the one or more sentences, each structured sentence object indicating a grammatical type of a corresponding word or article of punctuation in a corresponding sentence;
passing the one or more structured sentence objects into a machine-learned model trained by a machine learning algorithm to map commands in the one or more sentences to commands available in one or more software tools; and
generating an actionable objects list including the mapped commands available in the one or more software tools.

Example 2. The system of Example 1, wherein the operations further comprise:
sending the actionable objects list to an action executor on a computer system on which the online software service was running, the action executor designed to automatically execute the mapped commands in the actionable objects list to address the one or more technical issues.

Example 3. The system of Examples 1 or 2, wherein the actionable objects list further includes, for each of the mapped commands, a weightage indicative of criticality of the corresponding mapped command.

Example 4. The system of any of Examples 1-3, wherein the machine learning algorithm is a neural network.

Example 5. The system of any of Examples 1-4, wherein the operations further comprise, prior to performing natural language processing, replacing one or more technical terms in the one or more sentences with terms identified as safe for natural language processing, based on a mapping between technical terms and safe terms.

Example 6. The system of Example 5, wherein there is a different mapping for each of a plurality of different industries.

Example 7. The system of any of Examples 1-5, wherein the operations further comprise identifying one or more commands in the one or more sentences that are dependent upon on another.

Example 8. The system of any of Examples 1-6, wherein the service report contains a reference to another service report, and the operations further comprise, in response to detection of the reference, retrieving the another service report and performing the segmenting, performing natural language processing, passing, and generating on both the service report and the another service report at the same time.

Example 9. A method comprising:
accessing a service report, the service report having text indicating one or more technical issues detected during running of an online software service and, for each of the one or more technical issues, one or more recommendations on how to address the corresponding technical issue;
segmenting the text in the service report into one or more sentences;
performing natural language processing on the one or more sentences to identify one or more structured sentence objects of each of the one or more sentences, each structured sentence object indicating a grammatical type of a corresponding word or article of punctuation in a corresponding sentence;
passing the one or more structured sentence objects into a machine-learned model trained by a machine learning algorithm to map commands in the one or more sentences to commands available in one or more software tools; and
generating an actionable objects list including the mapped commands available in the one or more software tools.

Example 10. The method of Example 9, further comprising:
sending the actionable objects list to an action executor on a computer system on which the online software service was running, the action executor designed to automatically execute the mapped commands in the actionable objects list to address the one or more technical issues.

Example 11. The method of Examples 9 or 10, wherein the actionable objects list further includes, for each of the mapped commands, a weightage indicative of criticality of the corresponding mapped command.

Example 12. The method of any of Examples 9-11, wherein the machine learning algorithm is a neural network.

Example 13. The method of any of Examples 9-12, wherein the operations further comprise, prior to performing natural language processing, replacing one or more technical terms in the one or more sentences with terms identified as safe for natural language processing, based on a mapping between technical terms and safe terms.

Example 14. The method of Example 13, wherein there is a different mapping for each of a plurality of different industries.

Example 15. The method of any of Examples 9-14, further comprising identifying one or more commands in the one or more sentences that are dependent upon on another.

Example 16. The method of any of Examples 9-15, wherein the service report contains a reference to another service report, and the method further comprises, in response to detection of the reference, retrieving the another service report and performing the segmenting, performing natural language processing, passing, and generating on both the service report and the another service report at the same time.

Example 17. A non-transitory machine-readable medium storing instructions which, when executed by one or more processors, cause the one or more processors to perform operations comprising:

accessing a service report, the service report having text indicating one or more technical issues detected during running of an online software service and, for each of the one or more technical issues, one or more recommendations on how to address the corresponding technical issue;

segmenting the text in the service report into one or more sentences;

performing natural language processing on the one or more sentences to identify one or more structured sentence objects of each of the one or more sentences, each structured sentence object indicating a grammatical type of a corresponding word or article of punctuation in a corresponding sentence;

passing the one or more structured sentence objects into a machine-learned model trained by a machine learning algorithm to map commands in the one or more sentences to commands available in one or more software tools; and generating an actionable objects list including the mapped commands available in the one or more software tools.

Example 18. The non-transitory machine-readable medium of Example 17, wherein the operations further comprise:

sending the actionable objects list to an action executor on a computer system on which the online software service was running, the action executor designed to automatically execute the mapped commands in the actionable objects list to address the one or more technical issues.

Example 19. The non-transitory machine-readable medium of Examples 17 or 18, wherein the actionable objects list further includes, for each of the mapped commands, a weightage indicative of criticality of the corresponding mapped command.

Example 20. The non-transitory machine-readable medium of any of Examples 17-19, wherein the machine learning algorithm is a neural network.

Figure 8:
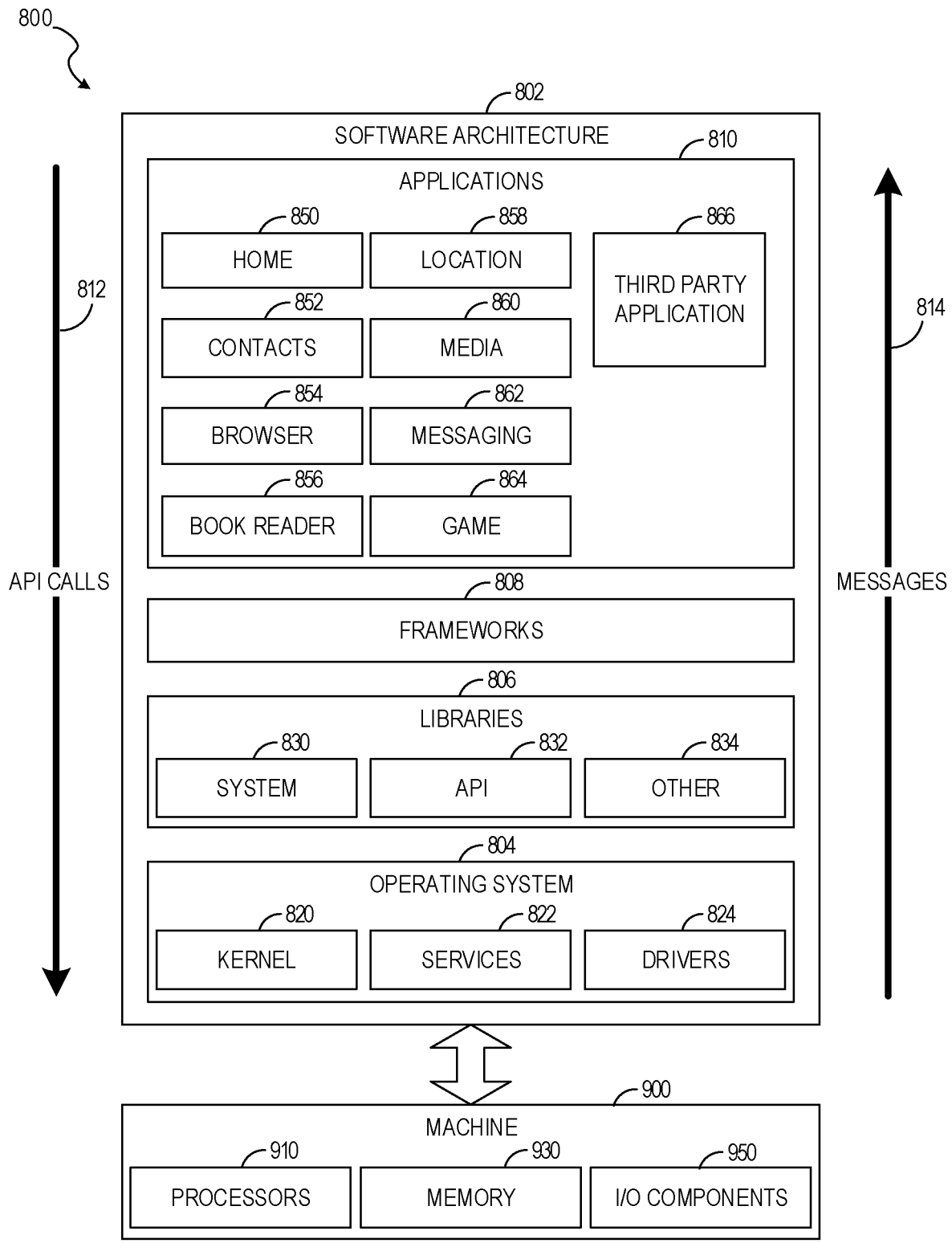
FIG. 8 is a block diagram illustrating an architecture of software, which can be installed on any one or more of the devices described above.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
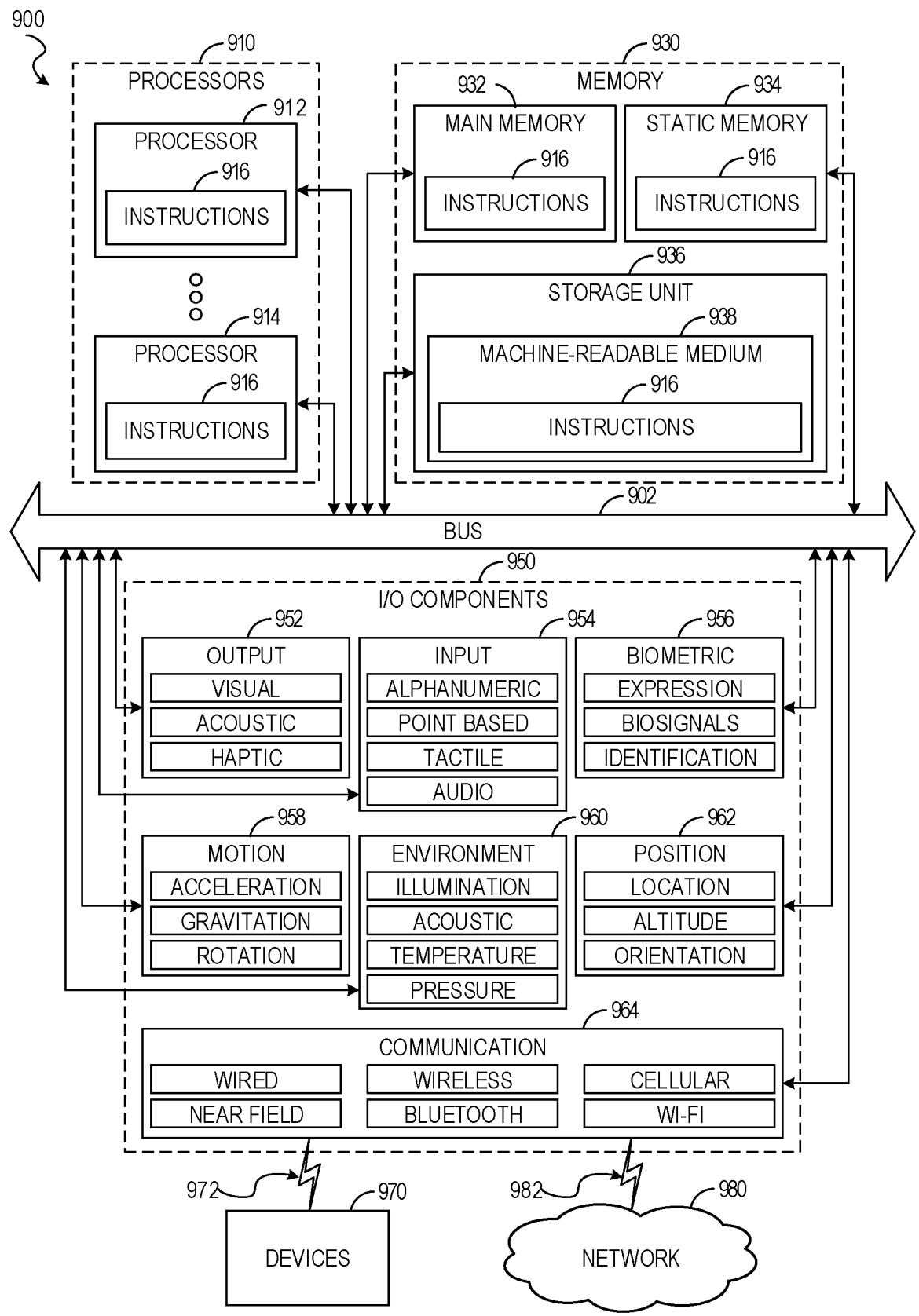
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the methods of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   accessing a service report, the service report having text indicating one or more technical issues detected during running of an online software service and, for each of the one or more technical issues, one or more recommendations on how to address a corresponding technical issue;
   segmenting the text in the service report into one or more sentences;
   performing natural language processing on the one or more sentences to identify one or more structured sentence objects of each of the one or more sentences, each structured sentence object indicating a grammatical type of a corresponding word or article of punctuation in a corresponding sentence;
   passing the one or more structured sentence objects into a machine-learned model trained by a machine learning algorithm to map commands in the one or more sentences to commands available in one or more software tools;
   generating an actionable objects list including the mapped commands available in the one or more software tools; and
   sending the actionable objects list to an action executor on a computer system on which the online software service was running, the action executor designed to automatically execute the mapped commands in the actionable objects list to address the one or more technical issues.

2. The system of claim 1, wherein the actionable objects list further includes, for each of the mapped commands, a weightage indicative of criticality of the corresponding mapped command.

3. The system of claim 1, wherein the machine learning algorithm is a neural network.

4. The system of claim 1, wherein the operations further comprise, prior to performing natural language processing, replacing one or more technical terms in the one or more sentences with terms identified as safe for natural language processing, based on a mapping between technical terms and safe terms.

5. The system of claim 4, wherein there is a different mapping for each of a plurality of different industries.

6. The system of claim 1 wherein the operations further comprise identifying one or more commands in the one or more sentences that are dependent upon one another.

7. The system of claim 1, wherein the service report contains a reference to another service report, and the operations further comprise, in response to detection of the reference, retrieving the another service report and performing the segmenting, performing natural language processing, passing, and generating on both the service report and the another service report at the same time.

8. A method comprising:
   accessing a service report, the service report having text indicating one or more technical issues detected during running of an online software service and, for each of the one or more technical issues, one or more recommendations on how to address a corresponding technical issue;
   segmenting the text in the service report into one or more sentences;
   performing natural language processing on the one or more sentences to identify one or more structured sentence objects of each of the one or more sentences, each structured sentence object indicating a grammatical type of a corresponding word or article of punctuation in a corresponding sentence;
   passing the one or more structured sentence objects into a machine-learned model trained by a machine learning algorithm to map commands in the one or more sentences to commands available in one or more software tools;
   generating an actionable objects list including the mapped commands available in the one or more software tools; and
   sending the actionable objects list to an action executor on a computer system on which the online software service was running, the action executor designed to automatically execute the mapped commands in the actionable objects list to address the one or more technical issues.

9. The method of claim 8, wherein the actionable objects list further includes, for each of the mapped commands, a weightage indicative of criticality of the corresponding mapped command.

10. The method of claim 8, wherein the machine learning algorithm is a neural network.

11. The method of claim 8, further comprising, prior to performing natural language processing, replacing one or more technical terms in the one or more sentences with terms identified as safe for natural language processing, based on a mapping between technical terms and safe terms.

12. The method of claim 11, wherein there is a different mapping for each of a plurality of different industries.

13. The method of claim 8, further comprising identifying one or more commands in the one or more sentences that are dependent upon on another.

14. The method of claim 8, wherein the service report contains a reference to another service report, and the method further comprises, in response to detection of the reference, retrieving the another service report and performing the segmenting, performing natural language processing, passing, and generating on both the service report and the another service report at the same time.

15. A non-transitory machine-readable medium storing instructions which, when executed by one or more processors, cause the one or more processors to perform operations comprising:
   accessing a service report, the service report having text indicating one or more technical issues detected during running of an online software service and, for each of the one or more technical issues, one or more recommendations on how to address a corresponding technical issue;
   segmenting the text in the service report into one or more sentences;
   performing natural language processing on the one or more sentences to identify one or more structured sentence objects of each of the one or more sentences, each structured sentence object indicating a grammatical type of a corresponding word or article of punctuation in a corresponding sentence;

passing the one or more structured sentence objects into a machine-learned model trained by a machine learning algorithm to map commands in the one or more sentences to commands available in one or more software tools;

generating an actionable objects list including the mapped commands available in the one or more software tools; and sending the actionable objects list to an action executor on a computer system on which the online software service was running, the action executor designed to automatically execute the mapped commands in the actionable objects list to address the one or more technical issues.

16. The non-transitory machine-readable medium of claim 15, wherein the actionable objects list further includes, for each of the mapped commands, a weightage indicative of criticality of the corresponding mapped command.

17. The non-transitory machine-readable medium of claim 15, wherein the machine learning algorithm is a neural network.

\* \* \* \* \*